(12) United States Patent
Kraftsow et al.

(10) Patent No.: US 9,507,855 B2
(45) Date of Patent: Nov. 29, 2016

(54) SYSTEM AND METHOD FOR SEARCHING INDEX CONTENT DATA USING MULTIPLE PROXIMITY KEYWORD SEARCHES

(71) Applicant: Renew Data Corp., Austin, TX (US)

(72) Inventors: Andrew P. Kraftsow, Sedona, AZ (US); Mary K. O'Brien, Camarillo, CA (US)

( * ) Notice: Subject to any disclaimer, the term of this patent is extended or adjusted under 35 U.S.C. 154(b) by 336 days.

(21) Appl. No.: 14/146,723

(22) Filed: Jan. 2, 2014

(65) Prior Publication Data

US 2015/0186469 A1     Jul. 2, 2015

(51) Int. Cl.
*G06F 17/30*     (2006.01)
(52) U.S. Cl.
CPC ... *G06F 17/30687* (2013.01); *G06F 17/30678* (2013.01)

(58) Field of Classification Search
CPC .................................................. G06F 17/30687
See application file for complete search history.

(56) References Cited

U.S. PATENT DOCUMENTS 7,765,178 B1 *   7/2010   Roizen .............. G06F 17/30687
2009/0055373 A1 *   2/2009   Haviv-Segal ..... G06F 17/30637

OTHER PUBLICATIONS

Examples of Operator Use, Sep. 10, 2012, Microsoft, pp. 1-2.*

* cited by examiner

*Primary Examiner* — Etienne Leroux
*Assistant Examiner* — Dara J Glasser
(74) *Attorney, Agent, or Firm* — Prudens Law LLC

(57) ABSTRACT

A system and method for searching indexed content data using multiple proximity keyword searches to quickly and efficiently locate subsets of data that are either relevant or irrelevant to an issue of interest to a user.

8 Claims, 2 Drawing Sheets

SYSTEM AND METHOD FOR SEARCHING INDEX CONTENT DATA USING MULTIPLE PROXIMITY KEYWORD SEARCHES

BACKGROUND OF THE INVENTION

1. Field of the Invention

The present invention relates to systems and methods involving techniques for review and analysis of content data (in paper or electronic form) such as a collection of documents. More particularly, the present invention relates to a system and method for improved keyword searching of a collection of documents.

2. Background

Search engine technology as improved the ability to quickly find results within a collection of documents as compared to a human needing to review each document within the collection. However, the quality and completeness of search results resulting from such conventional search engine techniques are often indefinite and therefore, unreliable. For example, one does not know whether the search engine used has indeed found every relevant document, at least not with any certainty.

One search engine technique currently used is a keyword search of a collection of documents. A user enters a search query consisting of one or more keywords and the search system uncovers all of the documents that have one or more words of the search query. However, in many cases, such a search technique only marginally reduces the number of documents to be reviewed, and a user cannot usefully examine the large quantities of documents returned.

Many of the documents retrieved in a standard search are typically irrelevant because these documents use the searched-for terms in a way or context different from that intended by the user. Words have multiple meanings. One dictionary, for example, lists more than 50 definitions for the word "pitch." In ordinary usage by skilled humans, such ambiguities are not a significant problem because skilled humans effortlessly know the appropriate word for any situation. One way to address this issue is to include synonyms of the search terms. For example, "elderly," "aged," "retired," "senior citizens," "old people," "golden-agers," and other terms are used to refer to the same group of people and can be included in a search query to increase the probability of finding the desired result.

However, such a process is useful when a user where a user is primarily concerned with finding any document that contains the precise information the user is seeking. Some applications of keyword searching, for example, discovery in litigation, require a high degree of precision and high recall. To address this issue, techniques have been developed that use lists of synonyms and phrases that encompass every imaginable word usage combination. However, in practice, the total number of documents retrieved by these queries is still quite large and computationally expensive to generate and analyze. So, a user is faced with two issues of identifying enough keywords so that the search may find the document or documents one is looking for, but at the same time limiting the keyword search so that the synonym list that must accompany the search query does not generate a large number of irrelevant documents.

There is a need for improved keyword search techniques that balance the need for the right number of search terms with the need to eliminate search terms that will not add to the effectiveness of the results.

SUMMARY OF THE INVENTION

The present invention relates to a system and method for searching indexed content data using multiple proximity keyword searches to quickly and efficiently locate subsets of data that are either relevant or irrelevant to an issue of interest to a user. In accordance with an embodiment of the present invention, a method for searching indexed content data using multiple proximity keyword searches comprises executing a search on a collection of documents wherein the search is configured as a Boolean proximity search query containing keyword defined by a user of the computer system. The proximity value may be any suitable number, however, preferred embodiments utilize a value from 40 to 60. The search returns a result set of documents from which a random document set is isolated. For each document in the isolated document set, search hits from the proximity query are located. The located search hits are added to a filtered word list that is used for further processing within the collection of documents.

In accordance with an embodiment of the present invention, a system for using multiple proximity keyword searches in a search query comprising a processor coupled to a bus, a memory coupled to the bus comprising computer executable instructions that when executed by the processor execute a search on a collection of documents wherein the search is configured as a Boolean proximity search query containing keyword defined by a user of the computer system. The proximity value may be any suitable number, however, preferred embodiments utilize a value from 40 to 60. The search returns a result set of documents from which a random document set is isolated. For each document in the isolated document set, search hits from the proximity query are located. The located search hits are added to a filtered word list that is used for further processing within the collection of documents.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. It should be understood that these drawings depict only typical embodiments of the invention and therefore, should not be considered to be limiting of its scope. The invention will be described and explained with additional specificity and detail through the use of the accompanying drawings in which.

DETAILED DESCRIPTION OF THE INVENTION

Various embodiments of the invention are described in detail below. While specific implementations involving electronic devices (e.g., computers) are described, it should be understood that the description here is merely illustrative and not intended to limit the scope of the various aspects of the invention. A person skilled in the relevant art will recognize that other components and configurations may be easily used or substituted than those that are described here without parting from the spirit and scope of the invention.

The computer system referenced has an architecture with functionalities that are configured to identify documents that are not relevant to a search query posed to quickly identify a data set of documents with little or no relevance to the query. Although not required, this invention will be described in the general context of computer-executable instructions, such as program modules within a system architecture comprising hardware and software. Generally, program modules include routines, programs, objects, scripts, components, data structures, etc., that performs particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. The present invention may also be practiced in and/or with personal computers (PCs), hand-held devices, multiprocessor systems, microprocessor-based or programmable consumer electronics, network PCs, minicomputers, mainframe computers, and the like.

Figure 1:
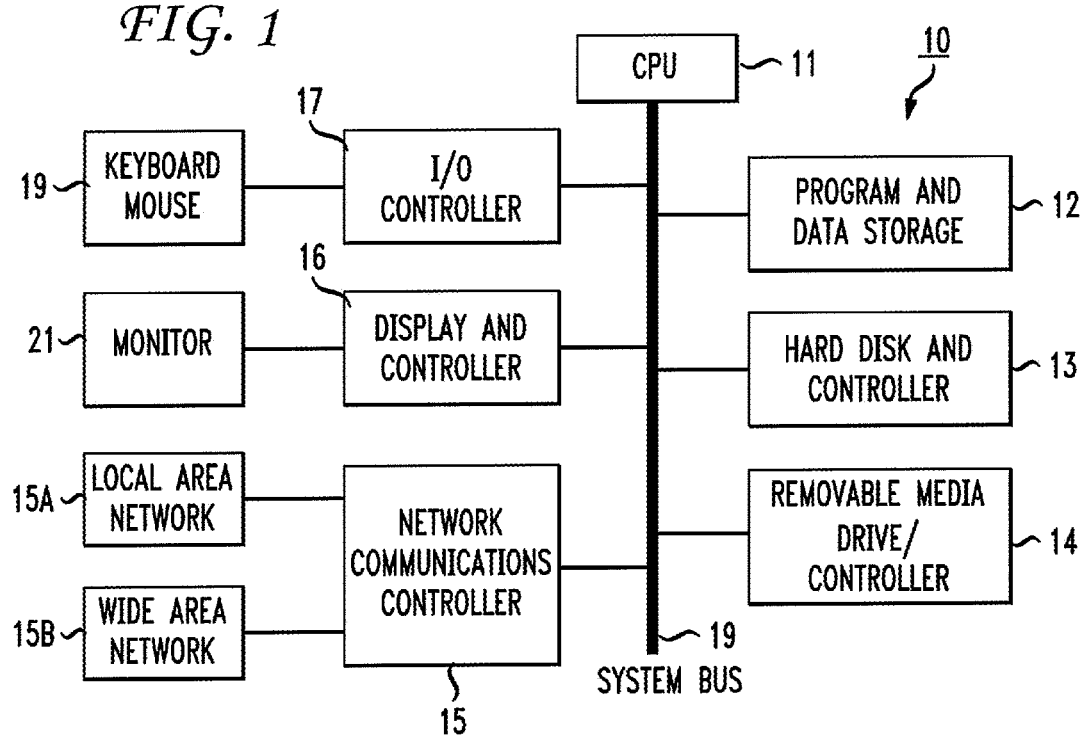
FIG. 1 is a block diagram of a computer system or information terminal on which programs operate to implement the methods of the inventions described here.

FIG. 1 is a schematic diagram of an exemplary computing environment in which the present invention may be implemented. The present invention may be implemented within a programmed computing device 10. One or more computer programs may be included in the implementation of the system and method described in this application. The computer programs may be stored in a machine-readable program storage device or medium and/or transmitted via a computer network or other transmission medium. The storage medium may be transitory or non-transitory.

Computer 10 includes CPU 11, program and data storage 12, hard disk (and controller) 13, removable media drive (and controller) 14, network communications controller 15 (for communications through a wired or wireless network (LAN or WAN, see 15A and 15B), display (and controller) 16 and I/O controller 17, all of which are connected through system bus 19. Although the exemplary environment described here employs a hard disk (e.g. a removable magnetic disk or a removable optical disk), it should be appreciated by those skilled in the art, that other types of computer readable media, which can store data that is accessible by a computer, such as magnetic cassettes, flash memory cards, digital video disks, Bernoulli cartridges, random access memory (RAM), read only memory (ROM), and the like, may also be used in the exemplary operating environment.

A number of program modules may be stored on the hard disk 13, magnetic disk, and optical disk, ROM or RAM, including an operating system, one or more application programs, other program modules, and program data. A user may enter commands and information into the computing system 10 through input devices such as a keyboard (shown at 19), mouse (shown 19) and pointing devices. Other input devices (not shown) may include a microphone, joystick, game pad, satellite dish, scanner, or the like. These and other input devices are often connected to the central processing unit 11 through a serial port interface that is coupled to the system bus, but may be connected by other interfaces, such as a parallel port, game port or a universal serial bus (USB). A monitor 21 or other type of display device is also connected to the system bus via an interface, such as a video adapter. In addition to the monitor 21, computers typically include other peripheral output devices (not shown), such as speakers and printers. The program modules may be practiced using any computer languages including C, C++, assembly language, and the like.

The computing system (CPU 11) indexes all data using a Boolean engine and extracts vocabulary words, which are all of the words contained in the data, and tracks the location and frequency of the word. Dictionary words are words that are known in advance, words that are likely found in a dictionary, or by some other means, where words are defined and classified. A dictionary may be a specialized dictionary, such as the IEEE dictionary or any other such technical dictionary. The lemma of each dictionary word is identified. For example, the words "running," "runs," and "ran" would all be identified as "run" and then all dictionary words are hierarchically organized by the part of speech to which they belong.

All non-dictionary words are verified with a spell checker and all words that are identified by the system to be possible proper spellings for the non-dictionary words are linked with the improper spellings. By this linking, when the properly spelled words are searched by the system, the system can take the improperly spelled words into consideration as well. This operation performed on the dictionary words by the system is then performed on those dictionary words that have been spell-checked. For words that do not have proper spellings identified with them after a spell checking operation, the system sends the words to a manual operator interface by which an operator can properly classify the words. These words, for example, are trade terms or trade names that do not appear in a dictionary or are words that are improperly spelled to such a degree that the spell checker cannot select a proper spelling. If they are words not recognized by a dictionary, the words are simply hierarchically organized by the parts of speech that they belong to.

The method further comprises the step of selecting two or more search terms, identifying synonyms of the search terms, and forming the query terms based on the search terms and synonyms. The probability that results from a Boolean search are relevant to a given topic or issue to research is directly related to the probability that the search query terms themselves are relevant to the issue to research, i.e. that those terms are relevant taking into account their usage and context within a collection of documents to be searched. In a collection of documents, there exist documents that are irrelevant to a desired issue to research. Being able to effectively isolate these irrelevant documents is important to conduct further research into the collection of relevant documents. When the collection of documents is large, avoiding unnecessary searching of irrelevant documents saves valuable time and expense.

One way to avoid searching irrelevant documents within a collection of documents is to perform a keyword search upon the collection and ascertain a group of documents that could not possibly (or most likely would not, within a desired confidence level) be about the desired issue to research. Isolating irrelevant documents encompasses performing a keyword search on the collection and isolating documents within the collection that are not responsive to the keyword search. To perform a reliable search, keywords and a list of each of the keyword's synonyms are produced. These lists of keywords and their synonyms are included in a Boolean search query and run against the collection of documents. However, for each keyword and/or synonym identified, the number of search terms to include within a Boolean expression quickly grows. Thus, even for simple issues or small collections of documents, searches can become computationally expensive and result in days or weeks needed to search the collection.

One aspect of the present invention enables the reduction of the number of terms needed to effectively and reliably search a collection of documents to determine which documents to isolate. The present invention relies upon multiple proximity searches that increase the confidence that a document not responsive to a search may be considered irrelevant. Unlike a random list of words, words in proximity to each other in a structured document, such as an email, a contract, a memorandum, etc., are presumed to be relevant to each other. Words "further away" from a selected word are presumed less relevant as distance from the selected word increases. For example, if term A and term B are within five words of each other, those terms have a higher probability that they are more relevant to each other than if term A and term B were found to be within 100 words of each other. By employing multiple proximity searches, the present invention can quickly identify irrelevant documents and narrow the corpus with a first proximity search while narrowing the number of terms to be used in searching the resulting collection of documents. Next, another proximity search is performed on the narrowed corpus. The subsequent search need only search the narrowed corpus of documents and like the first proximity search may further narrow the corpus while at the same time narrowing the number of terms to subsequently be used in searching the resulting collection of documents. Additional proximity searches may be performed to continue to narrow the corpus depending on the number of search terms initially chosen. After the proximity searches reduce the corpus and relevant keyword candidates (and the irrelevant documents are isolated) to a desired confidence level, further operations may be performed on the narrowed corpus.

Figure 2:
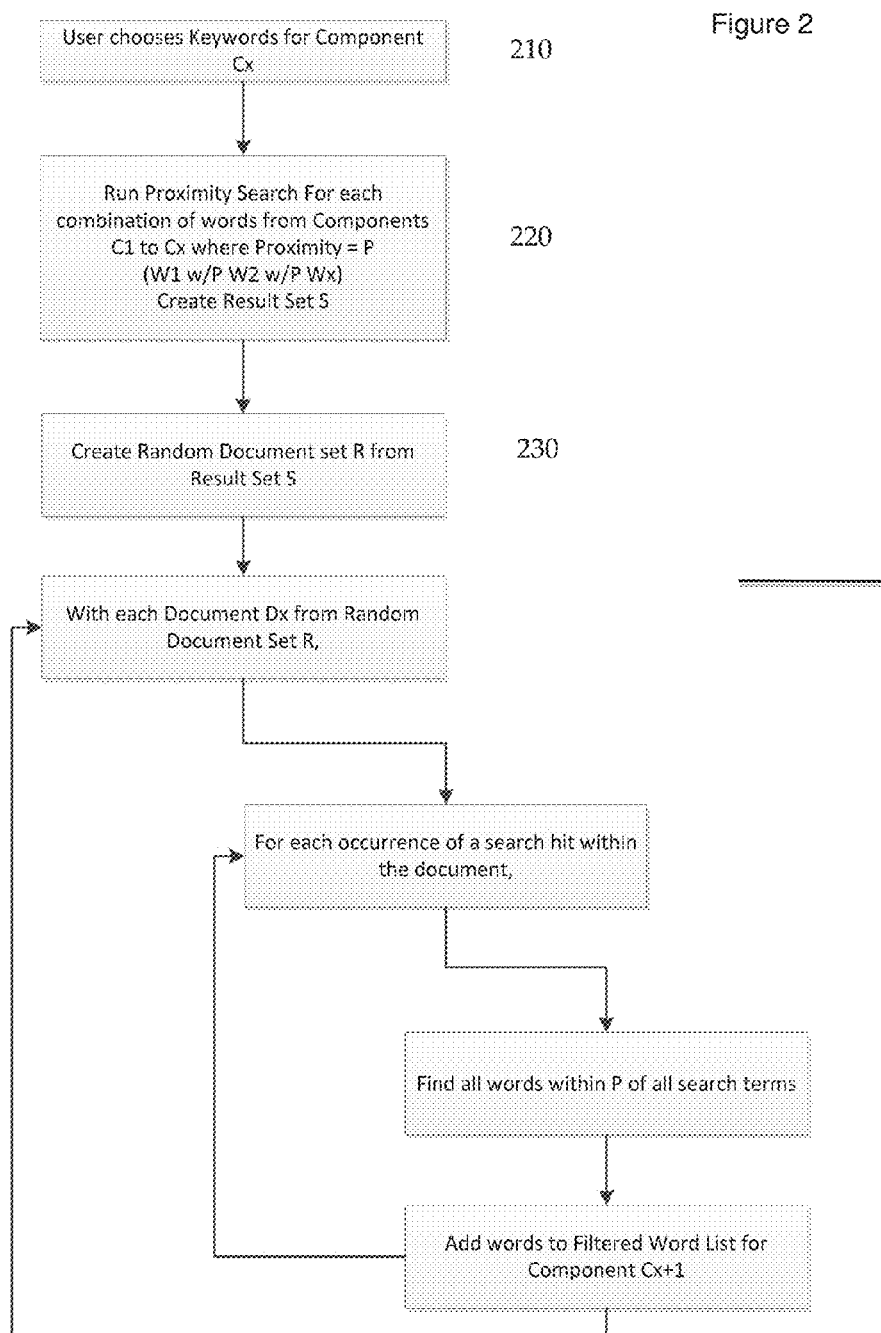
FIG. 2 is a flow chart illustrating the creating of an improved keyword list of the system and method described here.

FIG. 2 illustrates an exemplary method of the present invention. A user of the system chooses keywords for component, Cx, 210. The keywords are preferably chosen to best represent the desired issue to research. The number of keywords chosen may be based on a variety of issues unique to the collection of documents, for example, the type of documents, the desired issue to research, the overall subject matter or content within the documents. However, the number of keywords chosen must be made with the realization that the greater the number of keywords, the greater number of synonyms and other words within proximity to the selected keywords will be generated. Merely increasing the list of keywords may not increase the effectiveness of the search. In an exemplary embodiment, the number of keywords chosen is three.

A proximity search is performed on the collection of documents for each combination of words, C1 to Cx, 220. The search query takes the form of W1 w/P W2 w/P Wx, where P is the desired proximity. As discussed above, the chosen distance between words affects the effectiveness of the overall process. For example, with a large P-value, more terms will be considered to be relevant to the subsequent search, which in turn increases the time and expense of subsequent searches. However, a small P-value may risk decreasing the confidence and reliability of the search. In preferred embodiments, the P-value is within the range of 40-60. In an exemplary embodiment, the P-value is 50.

The proximity search result is a set of documents that match the search query. A random document set is created from this set of documents, 230. This random document set is used for subsequent processing at step 240. Each document with the random document set, 240, is inspected for search hits from the initial proximity search, 220. For each occurrence of a search hit, all words within P of all the search terms are found and added to a filter word list for component, Cx+1. This filtered word list is used for subsequent searching of the collection of documents.

As a further example, a proximity search is performed on a collection of documents so as to narrow the number of keywords and synonyms to use and the collection of documents to search. To search a collection of documents, a list of potential terms (e.g., keywords) is developed by a user. The potential terms are generally chosen to describe a desired issue to research. For example, within the context of litigation, a collection of documents may have been collected regarding a contract involving a water rights and possible fraud. A user may choose the terms "fraud," "contract," and "water" as initial keywords that describe the desired issue to research.

To begin the proximity search process, one word of the keyword list is chosen. Usually, the choice of the first word is based on the term that would have the fewest synonyms. In the example above, water likely has the fewest number of synonyms. The process performs a keyword search on the collection of documents using the first word 'water' and any additional forms of the word and any synonyms. For example, the search expression may be "water W/50 H2O." After the search is performed, two types of results occur. First, any document not responsive to the first search may be isolated and no longer included in the searching process. Thus, the corpus is narrowed. Second, the proximity search will return a list of all nouns and verbs in the collection that are within proximity, P, of the search terms.

As a non-limiting example, a proximity search wherein P=10 is performed on the following corpus:

Safe drinking water is essential to humans and other lifeforms even though it provides no calories or organic nutrients. Access has improved over the last decades in almost every part of the world, but approximately one billion people still lack such access many more lack access to adequate sanitation. Approximately 70% of the fresh water used by humans goes to agriculture.

The process examines the ten words within proximity to each instance of the term water and returns a list of the nouns and verbs within the ten word proximity. In the above example, the list of words returned is: safe, drink (root word of drinking), human, lifeform, access, sanitation, human, and agriculture.

Next, another term is chosen from the remaining terms on the keyword list. Again, the term with the least number of likely synonyms is chosen. In the example above, the term 'contract' may be chosen. As with the first term, any additional forms of 'contract' and its synonyms are determined. A second proximity search is performed on the narrowed corpus from the first search. The search expression includes the 'contract' term and its synonyms and the terms from the list of words resulting from the first proximity search. For example, assume contract has one synonym, agreement. Therefore, the second proximity search expression is "contract W/50 agreement W/50 [all the words from the first proximity search]." The process examines the ten words in proximity of all the search terms within the second search expression and returns those terms for further processing. This process repeats until the number of original keywords is exhausted. Once all keywords and its neighbors are found, these terms are added to a filtered word list for further processing.

Once the filtered word list is created, the system then creates every possible Boolean combination of the filtered word list and its synonyms for each query term preserving concept proximity expressions in an input logical expression of issue. By way of one example, the system takes an input logical expression of issue: A && W/5 B && P/1 C, where A has 2 Synonyms A1 and A2, B has 1 Synonym, and B1 and C have no Synonyms, and then generates the following additional queries: A && W/5 B1 && P/1 C, A1 && W/5 B && P/1 C, A1 && W/5 B1 && P/1 C, A2 && W/5 B && P/1 C and A2 && W/5 B1 && P/1 C. Where W/5 means that the proceeding word is within five words of the preceding word and where P/1 means that the preceding word is within one paragraph from the preceding word. The entire index is then searched and the system tags all of the results with their appropriate issue code, which defines why they are results and optionally highlights the query terms contained in them. After the system searches for all of the generated queries, the system tags all of the non-responsive documents as irrelevant.

The system by this operation identifies every item that could be matched to the query terms, regardless of the possible relevance of the various synonyms to provide a high level of confidence in the non-responsive documents being irrelevant to the initial query. There would then be left from the results, items that might be irrelevant based on the definition of the synonyms or items that do not reach some adequate level of relevancy, but do not have a near zero probability of relevancy as the non-responsive set have after the search is performed.

The specific embodiments and examples described herein are illustrative, and many variations can be introduced on these embodiments and examples without departing from the spirit of the disclosure or from the scope of the appended claims. For example, features of different illustrative embodiments and examples may be combined with each other and/or substituted for each other within the scope of this disclosure and appended claims.

What is claimed is:

1. A method for searching indexed content data using multiple proximity keyword searches, the method utilizing a computer system including a computer processor and at least one or more memories with stored data in electronic form relating to a collection documents, the method comprising the steps of:
   identifying, by a user of a computer system, a plurality of keywords relevant to a desired issue to research; and
   utilizing the computer processor to:
      create a first query to search a collection of structured documents, the first query configured as a Boolean query comprising a first keyword chosen from the plurality of keywords, and additional forms of the first keyword, and a first proximity value from 1 to 60;
      execute the first query and receive a first result set of documents and a first set of nouns and verbs in the collection of structured documents within the first proximity value of the first query's first keyword and additional forms of the first keyword;
      create a first narrowed set of documents by removing any document not responsive to the first query;
      create a second query to search the first narrowed set of documents, the second query configured as a Boolean query comprising (i) a second keyword chosen from the plurality of keywords and additional forms of the second keyword, (ii) the first set of nouns and verbs in the collection of structured documents within the first proximity value of the first query's first keyword and additional forms of the first keyword, and (iii) a second proximity value from 1 to 60;
      execute the second query and receive a second result set of documents and a second set of nouns and verbs in the collection of structured documents within the second proximity value of the second query's second keyword and additional forms of the second keyword and the first set of nouns and verbs;
      create a second narrowed set of documents by removing any document not responsive to the second query;
      repeat creation and execution of additional queries for each keyword, K, in the plurality of keywords, wherein the additional queries are in the form of:
         a K query to search the K−1 narrowed set of documents, the K query configured as a Boolean query comprising (i) a K keyword chosen from the plurality of keywords and additional forms of the K keyword, (ii) all nouns and verbs in the collection of structured documents returned from previously executed queries, and (iii) a K proximity value from 1 to 60;
      create a filtered word list comprising all nouns and verbs in the collection of structured documents returned from all previously executed queries;
      create a filtered word list query to search the collection of structured documents comprising every Boolean combination of the filtered word list and its synonyms; and
      execute the filtered word list query and receive a filtered word list set of documents.

2. The method of claim 1, wherein the number of keywords is three.

3. The method of claim 1, wherein at least one of the first, second, or K proximity values is 50.

4. The method of claim 1, further comprising tagging documents in the filtered word list set of documents with appropriate issue codes.

5. A system for using multiple proximity keyword searches in a search query comprising:
   a processor coupled to a bus; and
   a memory coupled to the bus comprising computer executable instructions that when executed by the processor:
      identify, with input from a user of the system, a plurality of keywords relevant to a desired issue to research;
      create a first query to search a collection of structured documents, the first query configured as a Boolean query comprising a first keyword chosen from the plurality of keywords and additional forms of the first keyword, and a first proximity value from 1 to 60;
      execute the first query and receive a first result set of documents and a first set of nouns and verbs in the collection of structured documents within the first proximity value of the first query's first keyword and additional forms of the first keyword;
      create a first narrowed set of documents by removing any document not responsive to the first query;
      create a second query to search the first narrowed set of documents, the second query configured as a Boolean query comprising (i) a second keyword chosen from the plurality of keywords and additional forms of the second keyword, (ii) the first set of nouns and verbs in the collection of structured documents within the first proximity value of the first query's first keyword and additional forms of the first keyword and (iii) a second proximity value from 1 to 60;
      execute the second query and receive a second result set of documents and a second set of nouns and verbs in the collection of structured documents within the second proximity value of the second query's second keyword and additional forms of the second keyword and the first set of nouns and verbs;

create a second narrowed set of documents by removing any document not responsive to the second query;

repeat creation and execution of additional queries for each keyword, K, in the plurality of keywords, wherein the additional queries are in the form of:

a K query to search the K−1 narrowed set of documents, the K query configured as a Boolean query comprising (i) a K keyword chosen from the plurality of keywords and additional forms of the K keyword, (ii) all nouns and verbs in the collection of structured documents returned from previously executed queries, and (iii) a K proximity value from 1 to 60;

create a filtered word list comprising all nouns and verbs in the collection of structured documents returned from all previously executed queries;

create a filtered word list query to search the collection of structured documents comprising every Boolean combination of the filtered word list and its synonyms; and execute the filtered word list query and receive a filtered word list set of documents.

6. The system of claim 5, wherein the number of keywords is three.

7. The system of claim 5, wherein at least one of the first, second, or K proximity values is 50.

8. The system of claim 5, further comprising the instruction: tag documents in the filtered word list set of documents with appropriate issue codes.

* * * * *